April 6, 1926.
O. TEEL
WRIST PIN
Filed Dec. 10, 1925
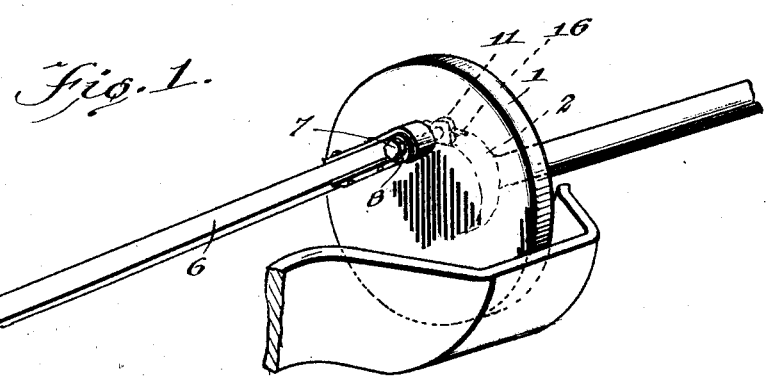
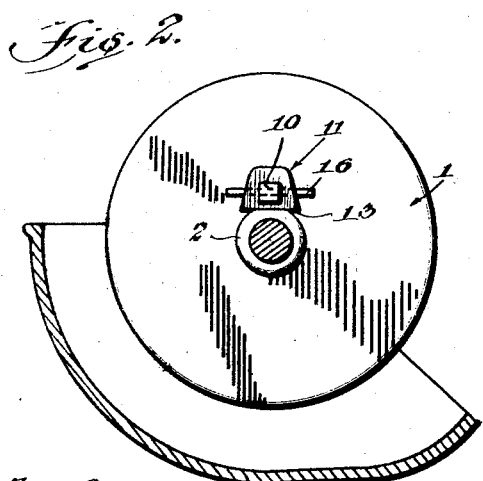
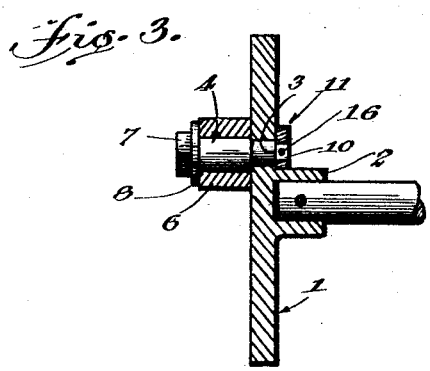
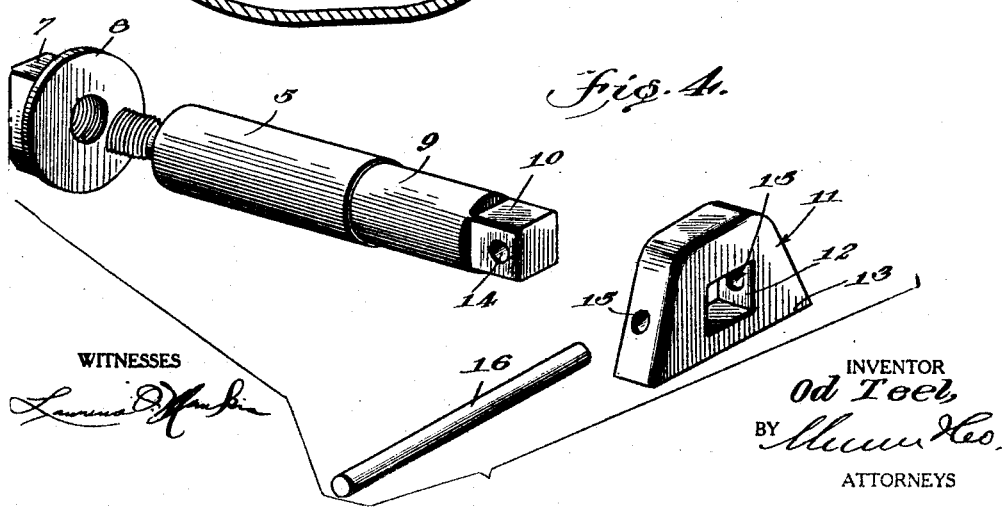
WITNESSES
INVENTOR
Od Teel,
BY
ATTORNEYS Patented Apr. 6, 1926.

1,579,969

UNITED STATES PATENT OFFICE.

OD TEEL, OF ECHO, OREGON.

WRIST PIN.

Application filed December 10, 1925. Serial No. 74,614.

*To all whom it may concern:*

Be it known that I, OD TEEL, a citizen of the United States, and a resident of Echo, in the county of Umatilla and State of Oregon, have invented certain new and useful Improvements in a Wrist Pin, of which the following is a specification.

This invention relates to an improved wrist pin specially adapted for mowers and has for its object the provision of a device of this character wherein the wrist pin may be firmly and securely fastened to the crank disk in such manner so as to prevent the wrist pin from turning relative to the crank disk and yet the wrist pin may be readily assembled with and taken from the crank disk. In this way the replacement of worn wrist pins is greatly facilitated.

A further object is to provide a device of the character specified and having the advantages and capacities mentioned and which is simple and durable in construction, reliable and efficient in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 1 is a fragmentary perspective view showing a wrist pin applied to the crank wheel or disk of the mower.

Figure 2 is a view thereof in elevation.

Figure 3 is a view partly in central vertical section and partly in elevation, and Figure 4 is a fragmentary perspective view showing the wrist pin and associated fastening devices.

Referring to the drawings, numeral 1 designates the crank wheel or disk of a mowing machine which has the usual hub 2 projecting laterally from one side and at the center of the disk. The disk is formed with a transverse opening 3 adapted to provide a mounting for the wrist pin designated generally at 4. The wrist pin 4 has a main portion 5 on which the pitman 6 is set and held by a nut 7 and washer 8. Beyond the main portion 4 the wrist pin is formed with a reduced mounting portion 9 terminated in a squared and reduced extension or end 10. The mounting portion 9 is fitted in the opening 3 of the crank disk and the end portion 10 projects beyond the disk and lies adjacent to but slightly spaced from the hub 2 of the crank disk. A fastening element 11 is provided and takes the form of a block having a squared opening 12 in which a squared end 10 of the wrist pin snugly fits in the assembly. The fastening element 11 has a flat and elongated base 13 which engages the hub 2 of the crank disk to prevent the fastening device and the wrist pin from turning relative to the crank disk. The end 10 of the wrist pin is provided with a transverse opening 14 which in the assembly is aligned with transverse opening 15 in the fastening element or block 11. Axial displacement of the fastening element from the wrist pin is prevented by means of a pin 16 which is a driving fit in the openings 15 and 16.

With this arrangement the wrist pin is not only firmly and rigidly secured to the crank disk but is positively held against rotation in its opening 3 due to the coaction of the block or fastening device 11 with the hub 2 of the crank disk. Along with this advantage the wrist pin may readily be replaced by punching out the pin 16 and slipping off the block or fastening device 11.

I claim:

1. In combination with a crank disk having a hub and having an opening, a wrist pin having a mounting portion fitted in the opening of the crank disk and projecting beyond the crank disk and over the hub, a fastening device fastened to the projecting portion of the wrist pin and also engaged with the hub of the crank disk so as to be held against angular movement.

2. In combination with a crank disk having a hub and also having an opening adapted to receive a wrist pin, a wrist pin having a mounting portion fitted in the opening of the crank disk and having a portion extending beyond the crank disk and disposed adjacent the hub, and a block fastened to the projecting portion and engaging the hub whereby it is held against angular movement and holds the wrist pin against angular movement.

3. In combination with a crank disk having a hub and also having an opening adapted to receive a wrist pin, a wrist pin having a mounting portion fitted in the opening of the crank disk and also having an extension of polygonal form projecting beyond the crank disk and disposed adjacent the hub, a fastening block having an opening of polygonal form in which the extension is snugly fitted, said block having a flat face engaging the hub whereby it is held against angular movement and means for preventing axial displacement of the block from the extension.

4. In combination with a crank disk having a hub and also having an opening adapted to receive a wrist pin, a wrist pin having a mounting portion fitted in the opening of the crank disk and also having an extension of polygonal form projecting beyond the crank disk and disposed adjacent the hub, a fastening block having an opening of polygonal form in which the extension is snugly fitted, said block having a flat face engaging the hub whereby it is held against angular movement, and means for preventing axial displacement of the block from the extension and comprising a pin, said block and said extension having aligned openings in which the pin is a driving fit.

5. A wrist pin having a mounting portion terminating in an extension of polygonal form, a block having an opening of polygonal form in which the extension is snugly fitted, and means for holding the block to the extension.

OD TEEL.